(12) United States Patent
Fukuda et al.

(10) Patent No.: US 8,565,494 B2
(45) Date of Patent: Oct. 22, 2013

(54) BIOMETRIC AUTHENTICATION DEVICE, BIOMETRIC AUTHENTICATION METHOD, AND COMPUTER PROGRAM FOR BIOMETRIC AUTHENTICATION

(75) Inventors: Mitsuaki Fukuda, Kawasaki (JP); Soichi Hama, Kawasaki (JP); Takahiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/326,035

(22) Filed: Dec. 14, 2011

(65) Prior Publication Data

US 2012/0082348 A1 Apr. 5, 2012

Related U.S. Application Data

(63) Continuation of application No. PCT/JP2009/061037, filed on Jun. 17, 2009.

(51) Int. Cl.
*G06K 9/00* (2006.01)

(52) U.S. Cl.
USPC .......................................... 382/115

(58) Field of Classification Search
USPC ........... 382/100, 115–119, 124, 128; 340/5.8, 340/5.84, 5.53, 5.74; 705/76, 18, 39, 41, 705/44; 434/155
See application file for complete search history.

(56) References Cited

U.S. PATENT DOCUMENTS

| | | | |
|---|---|---|---|
| 6,757,408 B2 * | 6/2004 | Houvener | 382/115 |
| 6,950,536 B2 * | 9/2005 | Houvener | 382/116 |
| 2003/0091724 A1 | 5/2003 | Mizoguchi | |
| 2008/0211627 A1 | 9/2008 | Shinzaki | |

FOREIGN PATENT DOCUMENTS

| | | |
|---|---|---|
| JP | 7-78248 | 3/1995 |
| JP | 8-115425 | 5/1996 |
| JP | 8-161491 | 6/1996 |
| JP | 2002-222424 | 8/2002 |
| JP | 2003-337949 | 11/2003 |
| JP | 2008-217355 | 9/2008 |

OTHER PUBLICATIONS

International Search Report for PCT/JP2009/061037 mailed Aug. 11, 2009.

* cited by examiner

*Primary Examiner* — Jose Couso
(74) *Attorney, Agent, or Firm* — Staas & Halsey LLP

(57) ABSTRACT

A biometric authentication device includes: a biometric information acquisition unit which generates a first input biometric image representing the biometric information of a user, a storage unit which stores data relating to registered biometric information of at least one registered user, and a processing unit. The processing unit realizes a quality judgment function which judges if the first input biometric image is suitable or not for use for comparison of the biometric information represented in the first input biometric image with the registered biometric information, a selection function which selects registered biometric information which is similar to biometric information represented in the first input biometric image among registered biometric information when the first input biometric image is judged unsuitable, and a matching process function which compares the user's biometric information represented in a second input biometric image with the selected registered biometric information.

10 Claims, 7 Drawing Sheets

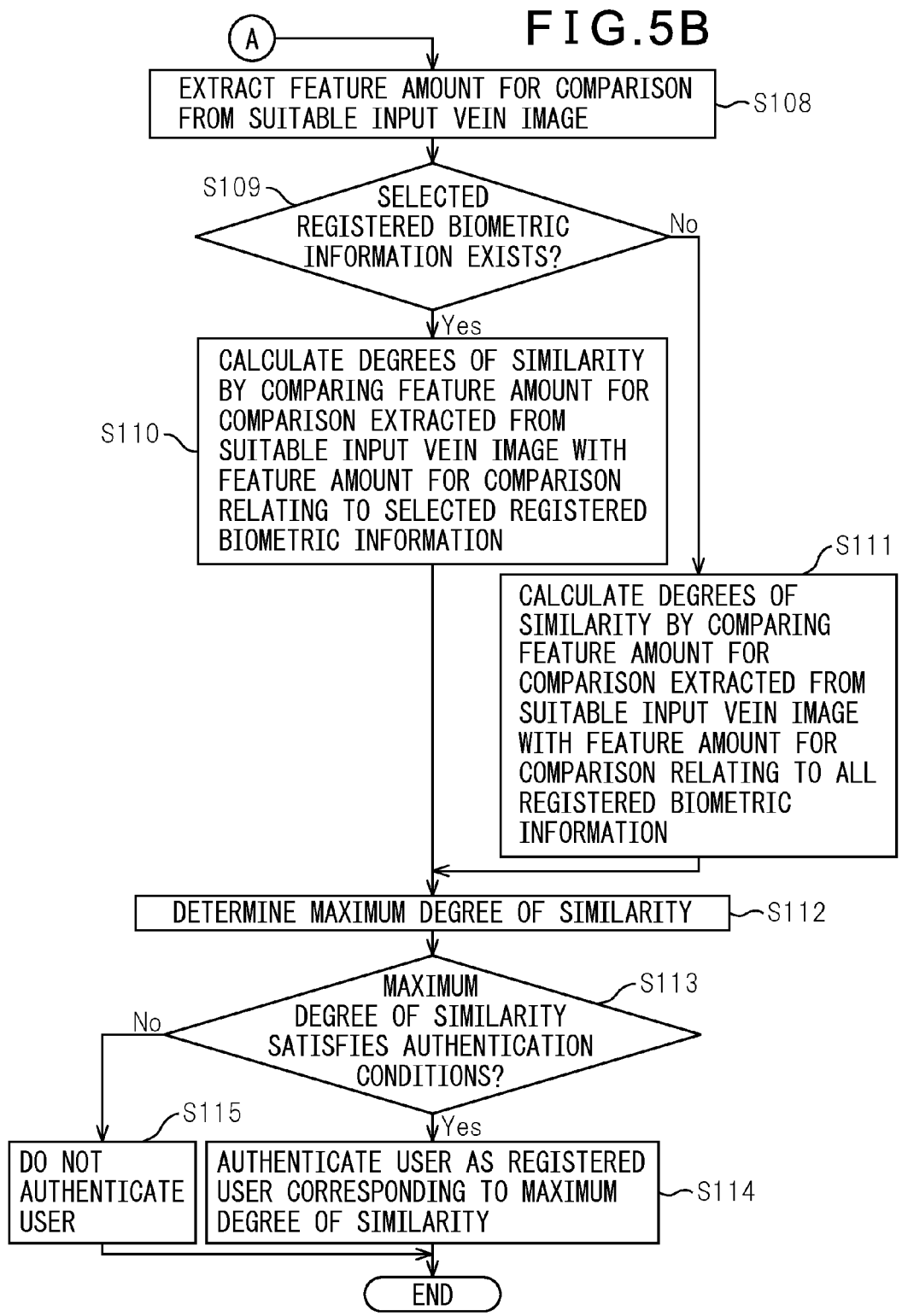

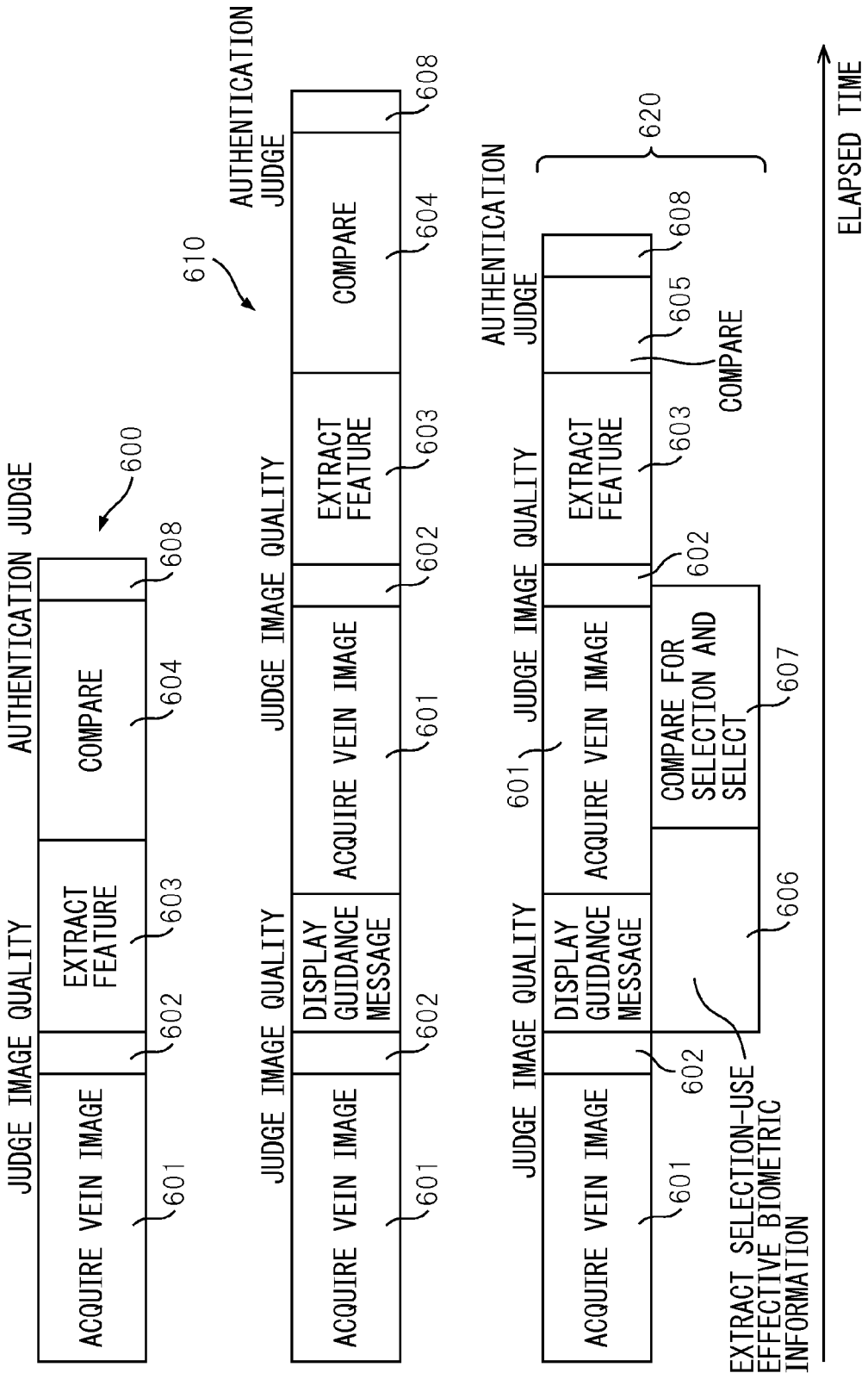

BIOMETRIC AUTHENTICATION DEVICE, BIOMETRIC AUTHENTICATION METHOD, AND COMPUTER PROGRAM FOR BIOMETRIC AUTHENTICATION

CROSS-REFERENCE TO RELATED APPLICATION

This application is a continuation application and is based upon PCT/JP2009/61037, filed on Jun. 17, 2009, the entire contents of which are incorporated herein by reference.

FIELD

The embodiments which are disclosed here relate to a biometric authentication device, biometric authentication method, and computer program for biometric authentication which compare biometric information which is represented in a biometric image with biometric information registered in advance to thereby judge whether to authenticate a person.

BACKGROUND

In recent years, biometric authentication technology has been developed for authenticating a user of an apparatus or system based on a biometric image representing biometric information such as the pattern of veins of the hand or finger, a fingerprint, palm print, etc. A biometric authentication device which utilizes such biometric authentication technology, for example, acquires a biometric image representing the biometric information of the user who is trying to use the biometric authentication device as the input biometric image. Further, the biometric authentication device compares the input biometric information of the user which is represented in the input biometric image with the registered biometric information which is a biometric information represented in biometric images of registered users registered in advance. If it is determined as a result of comparison that the input biometric information matches the registered biometric information, the biometric authentication device authenticates the user as a registered user having a legitimate right. Further, the biometric authentication device allows the user which was authenticated use of a system in which the biometric authentication device is built or another system which is connected to the biometric authentication device.

Such biometric authentication technology desirably has the characteristic structure of the biometric information clearly captured in the biometric image in order to compare a user with a high precision. However, depending on the positioning of the part of the body including the biometric information utilized for the comparison with respect to the sensor for inputting the biometric information, in the biometric image, part of the biometric information which should be used for the comparison will not be captured or the biometric information will end up becoming unclear.

For example, when the biometric authentication device acquires an image capturing the vein pattern of the hand of a user as a biometric image representing biometric information, if the hand as a whole is not included in the range of capture of the sensor, the obtained image will end up only capturing part of the vein pattern of the hand. Alternatively, if the hand strays far from the ideal position of the hand with respect to the sensor, the image of the vein pattern of the hand which is represented in the obtained image will be small and as a result detailed parts of the vein pattern will end up becoming unclear on the image.

In this way, if part of the biometric information which is represented in the biometric image is missing or if the biometric information is unclear, the biometric authentication device can no longer use the information of the missing part or unclear part for the comparison. For this reason, the biometric authentication device can no longer accurately examine the degree of match of the vein pattern represented in the image registered in advance and the vein pattern represented in the input image for that missing part or unclear part. As a result, the precision of comparison ends up falling.

Therefore, technology is being developed for reinputting the biometric image for a user when judging if a biometric image is suitable or not and judging that it is not suitable (see Japanese Laid-Open Patent Publication No. 8-161491 and Japanese Laid-Open Patent Publication No. 2003-337949).

SUMMARY

On the other hand, if the time required for running the biometric authentication process becomes long, the biometric authentication device ends up inconveniencing the user. Further, if reinput of a biometric image becomes necessary, the time required for the biometric authentication process ends up becoming longer by that amount. In particular, when a so-called 1-to-N comparison method is employed where input biometric information is compared with registered biometric information which is represented in a plurality of registered biometric images which are stored in advance in the biometric authentication device, the biometric authentication device has to run the biometric authentication process a plurality of times. For this reason, the biometric authentication device which employs this technology again reads the biometric information of the user, judges if the input biometric image which was generated by reading again is suitable, then runs the biometric authentication process a plurality of times. For this reason, this biometric authentication device ends up becoming long in the time required for running the biometric authentication process. Further, the greater the number of the registered biometric information which is registered in the biometric authentication device, the greater the number of times the biometric authentication process is run. For this reason, if a great number of registered biometric information is registered in the biometric authentication device, the wait time of the user until all of the biometric authentication process finishes remarkably increases and, as a result, the user is liable to become remarkably inconvenienced.

According to one embodiment, a biometric authentication device is provided. This biometric authentication device includes: a biometric information acquisition unit which acquires biometric information of a user and generates a first input biometric image which represents the biometric information, a storage unit which stores data relating to registered biometric information of at least one registered user registered in advance, and a processing unit. The processing unit realizes a quality judgment function which judges if the first input biometric image is suitable or not for use for comparison of the biometric information represented in the first input biometric image with the registered biometric information, a selection function which selects registered biometric information which is similar to biometric information which is represented in the first input biometric image among the registered biometric information when the first input biometric image is judged unsuitable, and a matching process function which compares the biometric information which is represented in second input biometric image which is generated by reacquisition of the biometric information of the user by the biometric information acquisition unit with the selected registered biometric information.

Furthermore, according to another embodiment, a biometric authentication method is provided. This biometric authentication method includes: acquiring biometric information of a user to generate a first input biometric image which represents the biometric information, judging if the first input biometric image is suitable or not for use for comparing the biometric information represented in the first input biometric image with the registered biometric information of at least one registered user registered in advance, selecting registered biometric information similar to the biometric information represented in the first input biometric image in the registered biometric information when the first input biometric image is judged unsuitable, reacquiring the biometric information of the user to thereby generate a second input biometric image, and comparing the biometric information represented in the second input biometric image with the selected registered biometric information.

Furthermore, according to another embodiment, there is provided a computer program which makes a computer perform biometric authentication by comparing biometric information of a user with registered biometric information of at least one registered user registered in advance to judge whether to authenticate the user or not. This computer program includes instructions for making a computer judge whether a first input biometric image which is generated by a biometric information acquisition unit is suitable or not for use for comparison of biometric information of the user which is represented in the first input biometric image with the registered biometric information of at least one registered user which is stored in a storage unit, selecting registered biometric information similar to the biometric information represented in the first input biometric image in the registered biometric information when the first input biometric image is judged unsuitable, and comparing biometric information represented in a second input biometric image generated by the biometric information acquisition unit with the selected registered biometric information.

The objects and advantages of the present application are realized and achieved by the elements and combinations thereof which are particularly pointed out in the claims.

The above general description and the following detailed description are both illustrative and explanatory in nature. It should be understood that they do not limit the application like the claims.

BRIEF DESCRIPTION OF THE DRAWINGS

FIG. 5A and 5B illustrate a flowchart of operation for biometric authentication process which is controlled by a computer program which is run by a processing unit.

FIG. 6 is a conceptual view which illustrates the time which is required for running the biometric authentication process according to an embodiment and the time which is required for running the biometric authentication process according to the prior art.

DESCRIPTION OF EMBODIMENTS

Figure 1:
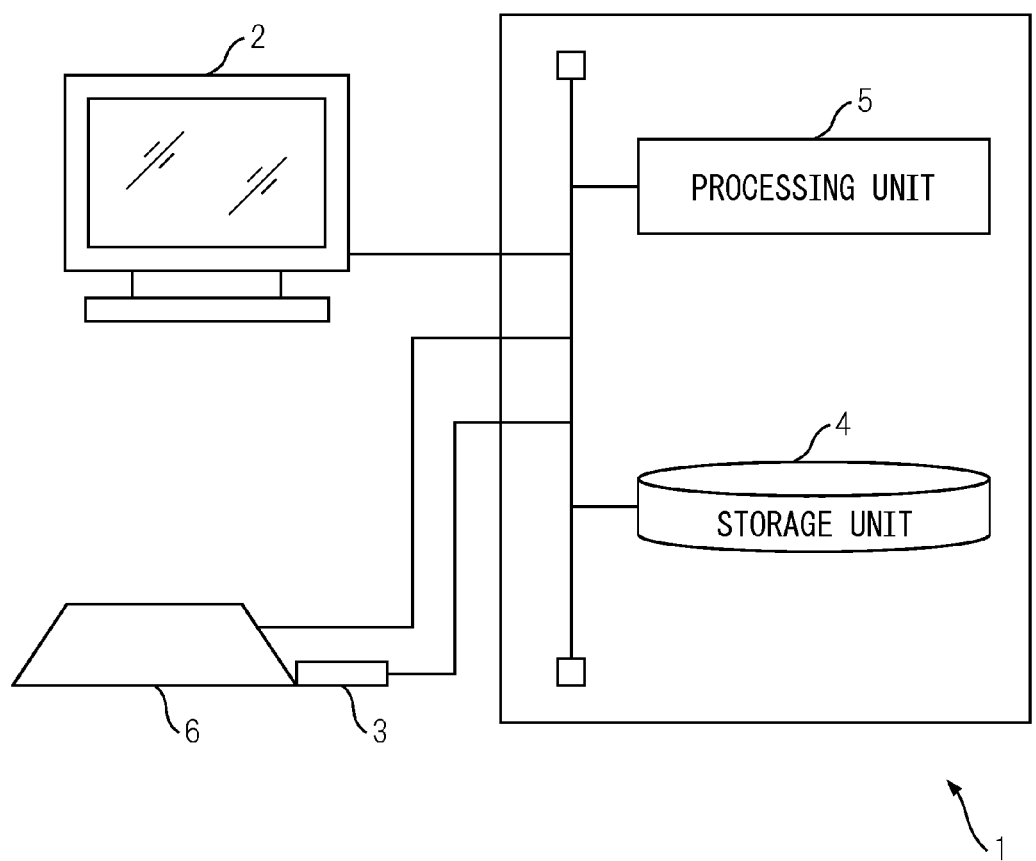
FIG. 1 is a schematic view of the configuration of a biometric authentication device according to an embodiment.

Below, a biometric authentication device according to an embodiment will be explained with reference to the drawings.

This biometric authentication device acquires an image which represents biometric information of a user when running biometric authentication process for the user. The image representing biometric information is an input biometric image. Further, this biometric authentication device compares biometric information of the user which is represented in the input biometric image with the biometric information of a plurality of registered users who are registered in advance in the biometric authentication device. The biometric information which is represented in the input biometric image is an input biometric information, and the biometric information of registered user is a registered biometric information. This biometric authentication device authenticates the user as a registered user corresponding to the registered biometric information which is judged to match with the input biometric information when judging that the input biometric information matches any of the registered biometric information based on the results of the matching process.

Here, this biometric authentication device instructs the user to reinput the biometric information when the input biometric information which is represented in the input biometric image is unclear, only part of the biometric information which should be used for comparison with the input biometric image is captured, or the input biometric information is otherwise incomplete. On the other hand, this biometric authentication device selects a registered biometric image in which registered biometric information is represented which is similar to the incomplete input biometric information from all of the registered biometric images which are registered in advance. Further, this biometric authentication device compares the input biometric information represented in a suitable input biometric image which is obtained by the user making the biometric information be read again and only the registered biometric information represented in the selected registered biometric image. Due to this, this biometric authentication device reduces the number of registered biometric images for running the biometric authentication process after reinput of the input biometric image and thereby shortens the processing time required for running the biometric authentication process as a whole.

In the present embodiment, the biometric authentication device utilizes the vein pattern of the hand or finger as the biometric information for biometric authentication. However, the biometric information for biometric authentication may also be a fingerprint, palm print, nose print, or other biometric information.

Further, in this Description, the term "matching process" is used for indicating processing for calculating the degree of similarity representing the degree of similarity between the input biometric information and the registered biometric information. Further, the term "biometric authentication process" is used to indicate the biometric processing as a whole including not only matching process, but also processing using the degree of similarity calculated by the matching process to determine whether to authenticate the user.

FIG. 1 is a schematic view of the configuration of a biometric authentication device. As illustrated in FIG. 1, this biometric authentication device 1 includes a display unit 2, biometric information acquisition unit 3, storage unit 4, and processing unit 5. The biometric authentication device 1 uses a vein image representing the vein pattern of the hand or finger of a user to run biometric authentication process. Further, when the biometric authentication device 1 authenticates that the user is one of the registered users registered in advance in the biometric authentication device 1 as a result of the biometric authentication process, the system in which the biometric authentication device 1 is mounted approves use by the user. Alternatively, the biometric authentication device 1 sends a not illustrated other system a signal representing the authentication of the user and allows the user to use the other system.

Note that, the biometric authentication device 1 may include, for example, a keyboard, mouse, touchpad, or other input unit 6. Further, the biometric authentication device 1 may acquire commands, data, or user identification information which are input by the user through the input unit 6 and transfer the command, data, or user identification information to the processing unit 5. However, when the user does not have to input information other than the biometric information to the biometric authentication device 1, this input unit 6 may be omitted.

The display unit 2 includes, for example, a liquid crystal display or CRT monitor or other display device. Further, the display unit 2 displays a guidance message to the user for prompting him to place the hand or finger at a position where the biometric information acquisition unit 3 can acquire a suitable vein image. Further, the display unit 2 displays various types of information relating to applications which are run by the processing unit 5.

The biometric information acquisition unit 3 generates an input vein image which represents the vein pattern of the hand or finger of the user. For this reason, the biometric information acquisition unit 3, for example, includes a 2D sensor and an optical system which is arranged so as to focus an image of the object arranged in the predetermined capture region on the 2D sensor. Further, the biometric information acquisition unit 3 transfers the generated input vein image to the processing unit 5. Note that, the biometric information acquisition unit 3 may further include a light source for emitting near infrared light to the hand or finger of the user.

Note that, the display unit 2 and the biometric information acquisition unit 3 may also be formed integrally.

The storage unit 4 includes at least one of, for example, a semiconductor memory, magnetic disk device, or optical disk device. Further, the storage unit 4 stores the application programs which are used by the biometric authentication device 1, the identification information and individual setting information of at least one registered user, various data, etc. Further, the storage unit 4 stores a program for running the biometric authentication process. Furthermore, the storage unit 4 stores data relating to the vein pattern of the hand or a specific finger of the registered user. The vein pattern of the registered user is the registered biometric information of a registered user. This data relating to the registered biometric information may, for example, be an image capturing the vein pattern of either the left or right hand or a specific finger of the registered user. The image capturing the vein pattern of the registered user is a registered vein image. Alternatively, this data relating to the registered biometric information may be a feature for matching process which is extracted from the registered vein image itself or a partial region of the same.

Furthermore, the storage unit 4 may store, as one type of data relating to the registered biometric information separate from the feature for the matching process, effective biometric information for the later explained selection processing which is extracted from the registered vein image.

Further, the storage unit 4 stores a guidance message for prompting placement of the hand or finger at a position at which the biometric information acquisition unit 3 can acquire a suitable vein image.

The processing unit 5 includes one or more processors and their peripheral circuits. Further, the processing unit 5 runs biometric authentication process using the input vein image representing the vein pattern of the user which is acquired from the biometric information acquisition unit 3.

If the hand or finger of the user is placed at a suitable position with respect to the biometric information acquisition unit 3, at the obtained input vein image, part of the vein pattern to be used for the comparison will be missing or become unclear. For this reason, if using an input vein image capturing the hand or finger which is placed at an unsuitable position with respect to the biometric information acquisition unit 3, the biometric authentication device 1 cannot run accurate matching process.

Figure 2A:
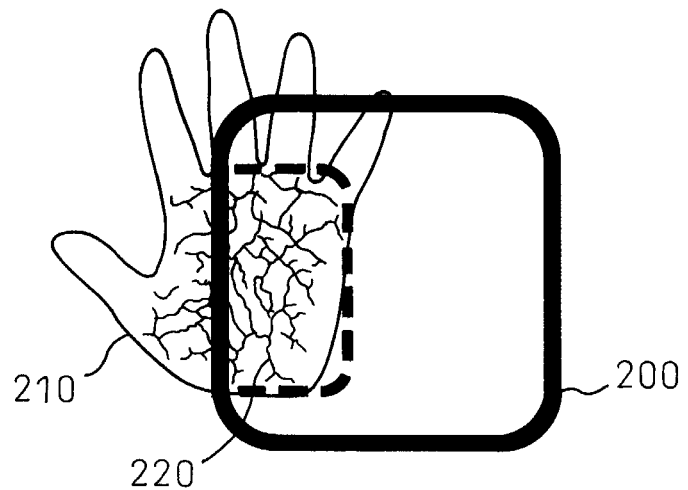
FIGS. 2A to 2C illustrate one example of the positional relation of a capture region of a biometric information acquisition unit and a hand.
Figure 2B:
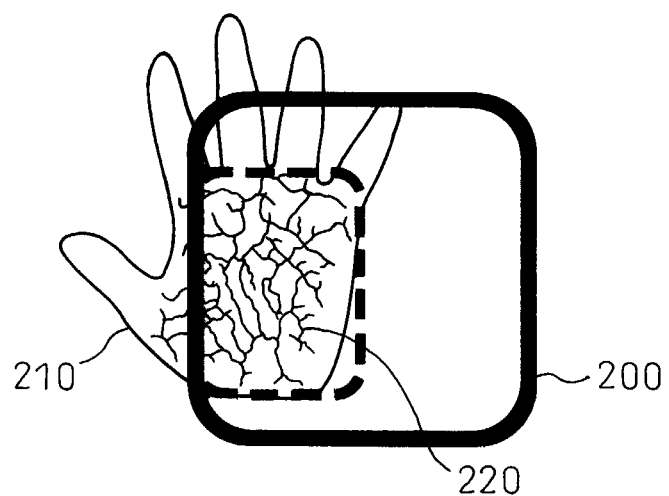
Figure 2C:
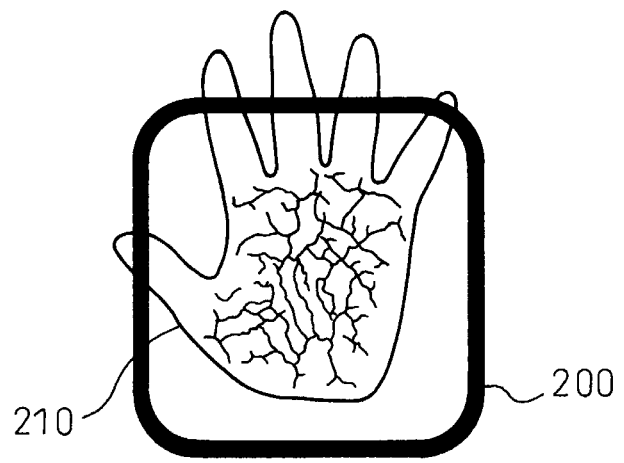

FIGS. 2A to 2C illustrate one example of the positional relationship of the capture region of the biometric information acquisition unit 3 and the hand. In this example, the user moves his own hand in the horizontal direction from the left with respect to the capture region 200 of the biometric information acquisition unit 3. In FIG. 2A, only about half of the hand 210 of the user is in the capture region 200. For this reason, the input vein image which is acquired in the state which is illustrated in FIG. 2A captures only about half of the vein pattern of the palm part of the hand. As a result, the processing unit 5 may not be able to accurately compare the vein pattern of the user with the vein pattern of the registered user if using the input vein image which is acquired in the state which is illustrated in FIG. 2A for the matching process since the information of about half of the vein pattern of the palm of the hand is missing.

Further, in FIG. 2B, the range of the hand 210 of the user which is included in the capture region 200 is wider than in FIG. 2A, but the vein pattern near the thumb is still outside of the capture region 200. For this reason, if the processing unit 5 uses the input vein image which is acquired in the state which is illustrated in FIG. 2B for the matching process, an improvement in the comparison precision can be expected over use of the input vein image which is acquired in the state which is illustrated in FIG. 2A. However, the processing unit 5 may not be able to accurately compare the vein pattern of the user with the vein pattern of the registered user.

As opposed to this, in FIG. 2C, the capture region 200 includes substantially the entire region of the hand 210 of the user. For this reason, the input vein image which is acquired in the state which is illustrated in FIG. 2c captures all of the vein pattern of the palm part of the hand. As a result, the processing unit 5 can use the input vein image which is acquired in the state which is illustrated in FIG. 2C for the matching process FIG. 2C so as to accurately compare the vein pattern of the user with the vein pattern of the registered user.

Figure 3A:
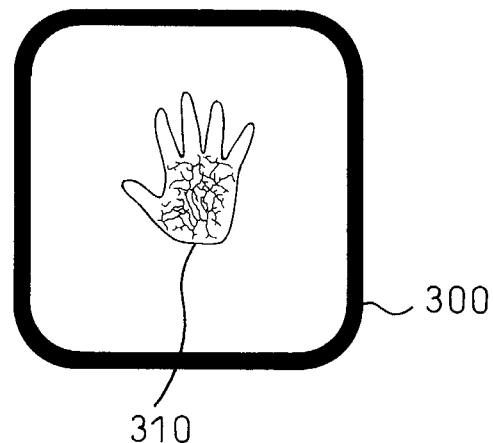
FIGS. 3A to 3C illustrate another example of the positional relation of a capture region of a biometric information acquisition unit and a hand.
Figure 3B:
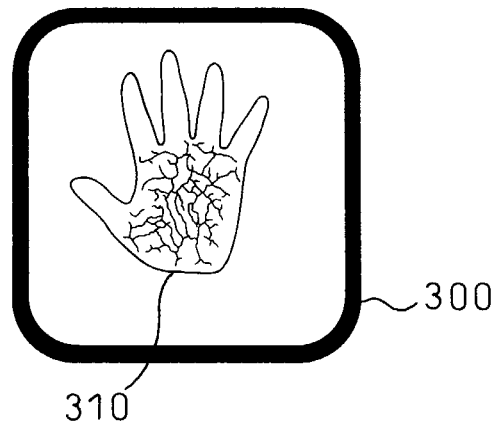
Figure 3C:
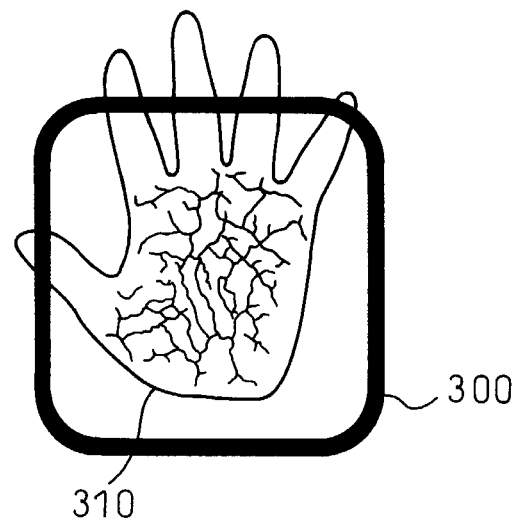

FIGS. 3A to 3C illustrate another example of the positional relationship of the capture region of the biometric information acquisition unit 3 and the hand. In this example, the user moves his own hand along a direction perpendicular to the sensor surface of the biometric information acquisition unit 3 so as to approach the biometric information acquisition unit 3. In FIG. 3A, the area of the hand 310 of the user occupied in the capture region 300 becomes less than half of the area in the case where the hand of the user is placed at a suitable position. Further, the biometric information acquisition unit 3 and the hand of the user are separated, so the noise component superposed on the input vein image may become greater. For this reason, in the input vein image which is acquired in the state which is illustrated in FIG. 3A, the detailed structure of the vein pattern in the palm part of the hand may become unclear. As a result, if the processing unit 5 uses the input vein image which is acquired in the state which is illustrated in FIG. 3A for matching process, it is not possible to utilize information relating to the fine structure of the vein pattern. For this reason, the processing unit 5 may not be able to accurately compare the vein pattern of the user with the vein patterns of registered users.

Further, in FIG. 3B, the area of the hand 310 of the user occupied in the capture region 300 becomes larger than FIG. 3A, but the area of the hand 310 is smaller than the area of the hand in the case where the hand of the user is placed at a suitable position. For this reason, if the processing unit 5 uses the input vein image which is acquired in the state which is illustrated in FIG. 3B for matching process, it is possible to expect an improvement in the comparison precision compared with use of the input vein image which is acquired in the state which is illustrated in FIG. 3A. However, the processing unit 5 may not be able to accurately compare the vein pattern of the user with the vein patterns of registered users.

As opposed to this, in FIG. 3C, the hand of the user is placed at a suitable position, so the area of the hand 310 of the user in the capture region 300 becomes sufficiently large. For this reason, in the input vein image which is acquired in the state which is illustrated in FIG. 3C, the fine structure of the vein pattern of the palm part of the hand can also be discerned. As a result, the processing unit 5 can use the input vein image which is acquired in the state which is illustrated in FIG. 3C for the matching process so as to accurately compare the vein pattern of the user with the vein patterns of registered users.

However, the input vein image which is acquired in the state which is illustrated in FIG. 2A or FIG. 2B, or FIG. 3A or FIG. 3B also captures the structure of at least part of the vein pattern. Further, there are large individual differences in vein patterns. For this reason, even if the processing unit 5 compares only part of the vein pattern of the user with the vein patterns of registered users, the vein patterns of the majority of registered users can be accurately judged not to match the vein pattern of the user. Therefore, the processing unit 5 compares the biometric information relating to the hand of the user represented in the unsuitable input vein image with the biometric information relating to the hands of the registered users when an unsuitable input vein image captured in the state where the hand of the user is placed at an unsuitable position is obtained. Further, the processing unit 5 selects only the data relating to the vein patterns of the registered users corresponding to the biometric information which match the biometric information relating to the hand represented in the unsuitable input vein image to a certain extent, among the data relating to the vein patterns of all of the registered users. Further, the processing unit 5 runs the matching process covering only the selected data of the vein patterns of the registered users when an input vein image which is captured in the state where the hand of the user is placed at a suitable position is obtained.

Figure 4:
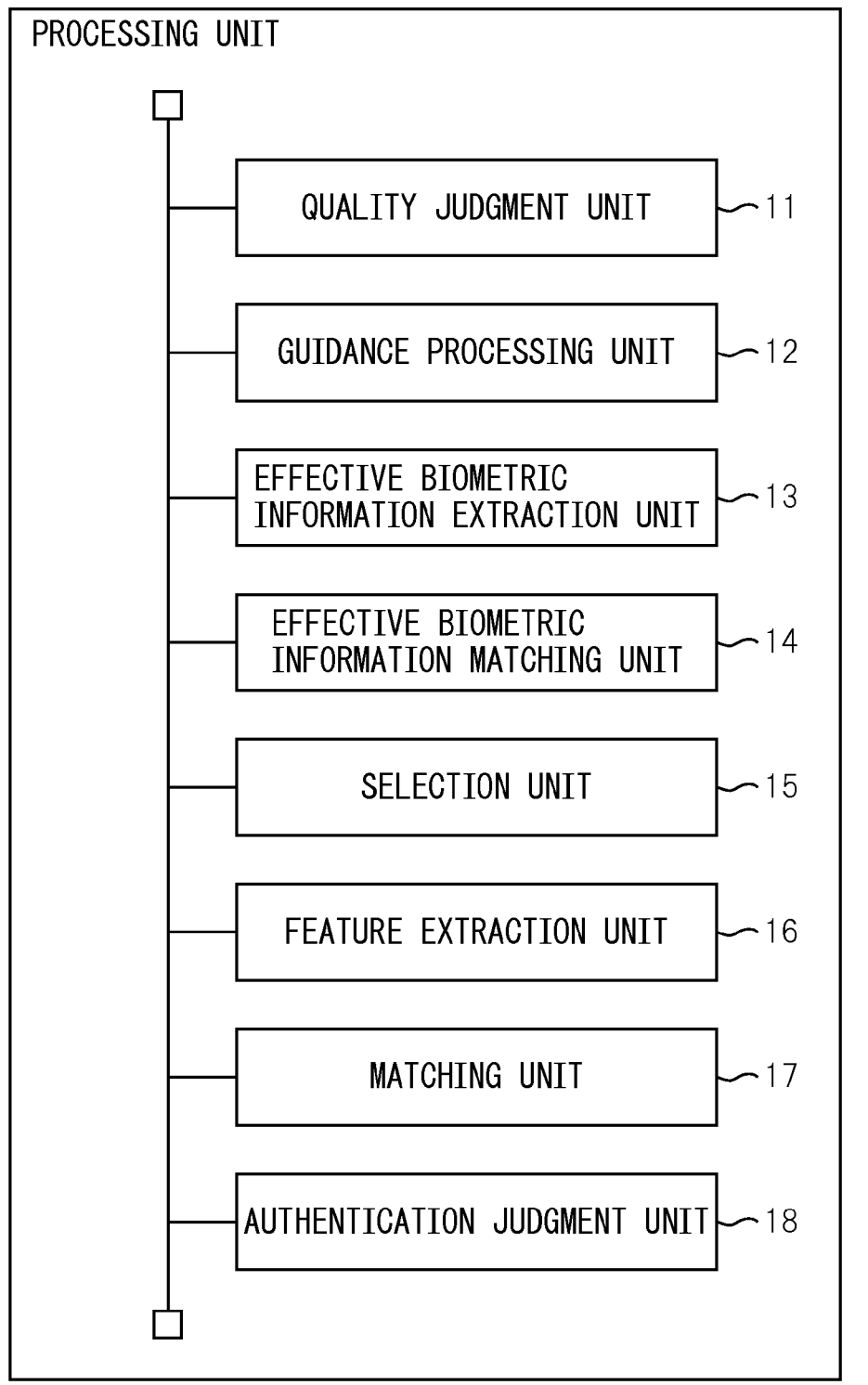
FIG. 4 is a functional block diagram of a processing unit in the biometric authentication device according to an embodiment, illustrating the functions implemented to perform the biometric authentication for the authentication of a user.

FIG. 4 is a functional block diagram of the processing unit 5 illustrating the functions which are realized for running the biometric authentication process. As illustrated in FIG. 4, the processing unit 5 includes a quality judgment unit 11, guidance processing unit 12, effective biometric information extraction unit 13, effective biometric information matching unit 14, selection unit 15, feature extraction unit 16, matching unit 17, and authentication judgment unit 18. These units of the processing unit 5 are functional modules implemented by executing a computer program on the processor incorporated in the processing unit 5. Alternatively, these units of the processing unit 5 may be implemented as firmware in the biometric authentication device 1.

The quality judgment unit 11 judges if the input vein image which is generated by the biometric information acquisition unit 3 is suitable for use for the matching process.

For example, the quality judgment unit 11 compares the pixel values of the pixels of the input vein image with a binary threshold value to binarize the input vein image. The binary threshold value, for example, may be the average of the pixel values of the input vein image. Further, in the input vein image, when the values of the pixels included in the region in which the hand of the user is captured are high and the values of the pixels included in the background region in which nothing is captured are low, the quality judgment unit 11 deems pixels to be hand region candidate pixels when the pixel values are higher than the binary threshold value. Further, the quality judgment unit 11 labels the hand region candidate pixels which are obtained for the input vein image as a whole and detects a hand region which is a region to which the hand region candidate pixels are connected as the image of the part including the vein pattern used for comparison.

Note that, whether or not the values of the pixels which are included in the region in which the hand of the user is captured, become higher than the values of the pixels which are included in the background region, is determined depending on the configuration of the biometric information acquisition unit 3. For this reason, when the values of the pixels which are included in the region in which the hand of the user is captured become lower than the values of the pixels which are included in the background region, the quality judgment unit 11 may deem the pixels having pixel values lower than the binary threshold value to be hand region candidate pixels.

The quality judgment unit 11 determines quality judgment indicators which are indicators for judging if the input vein image is suitable for use for the matching process. Further, the quality judgment unit 11 judges that an input vein image is unsuitable when any of the quality judgment indicators indicate that the image of the hand or finger of the user captured in the input vein image is so small that it is difficult for the fine parts of the vein pattern to be judged. Further, the quality judgment unit 11 judges that the input vein image is unsuitable when any of the quality judgment indicators indicate that at least part of the image of the hand or finger in which the vein pattern utilized for comparison is included is missing in the input vein image. On the other hand, the quality judgment unit 11 judges that the input vein image is suitable when any of the quality judgment indicators indicate that the vein pattern which is utilized for comparison can be discerned from the image of the hand or finger of the user which is captured in the input vein image.

Below, an input vein image which is judged to be unsuitable will be called an "unsuitable input vein image", while an input vein image which is judged to be suitable will be called a "suitable input vein image".

In the present embodiment, the quality judgment unit 11 calculates the area and center of gravity position of the hand region as an example of the quality judgment indicators. Further, the quality judgment unit 11 may calculate the number of pixels which contact image ends of the input vein image among the pixels included in the hand region as another example of the quality judgment indicators. For example, the quality judgment unit 11 judges that the input vein image is unsuitable when the center of gravity position of the hand region is within a predetermined distance from any of the image ends of the input vein image. This predetermined distance may be half of the average value of the width of the hand region on the input vein image when, for example, the hand or finger of a person is placed at a suitable position with respect to the biometric information acquisition unit 3.

Further, the quality judgment unit 11 may also judge an input vein image is unsuitable when the difference between the number of pixels in the hand region which contacts the image end of either of the left or right of the input vein image and the number of pixels in the hand region which contacts the other image end is a predetermined threshold value or more. This predetermined threshold value, for example, may be ⅓ or ¼ of the length in the up-down direction of the hand region on the input vein image.

Furthermore, the quality judgment unit 11 may judge that the input vein image is unsuitable if the area of the hand region is smaller than a minimum allowable area obtained by multiplying a reference area, which is an average area of the hand region on the input vein image when the hand or finger or a person is placed at a suitable position with respect to the biometric information acquisition unit 3, with a predetermined coefficient. This minimum allowable area corresponds to the minimum value of the area of the hand region at which fine parts of the vein pattern which is used for the matching process can be discerned on the input vein image and, for example, may be a value included in the range of the reference area multiplied with 0.5 to 0.8.

The quality judgment unit 11 estimates the cause of the unsuitability when the input vein image is judged unsuitable. For example, when the center of gravity position of the hand region is within the predetermined distance from the left end of the image of the input vein image, the quality judgment unit 11 estimates that the cause of the unsuitability is that the position of the hand or finger of the user is too much to the right side with respect to the biometric information acquisition unit 3. Further, the number of pixels in the hand region which contacts the left end of the input vein image is sometimes the predetermined threshold value or more than the number of pixels in the hand region which contacts the right end of the input vein image. In this case as well, the quality judgment unit 11 estimates that the cause of the unsuitability is that the position of the hand or finger is too much to the right side from the biometric information acquisition unit 3. On the other hand, when the center of gravity position of the hand region is within the predetermined distance from the right end of the image of the input vein image, the quality judgment unit 11 estimates that the cause of the unsuitability is that the position of the hand or finger is too much to the left side from the biometric information acquisition unit 3. Further, the number of pixels in the hand region which contact the right end of the input vein image is sometimes the predetermined threshold value or more larger than the number of pixels in the hand region which contact the left end of the input vein image. In this case as well, the quality judgment unit 11 estimates that the cause of the unsuitability is that the position of the hand or finger is too much to the left side from the biometric information acquisition unit 3.

Furthermore, sometimes the center of gravity position of the hand region and the number of pixels in the hand region which contact the image end do not satisfy the condition for judging the input vein image to be unsuitable and the input vein image is judged unsuitable since the area of the hand region is small. In this case, the quality judgment unit 11 estimates that the cause of the unsuitability is that the position of the hand or finger is too far from the biometric information acquisition unit 3.

The quality judgment unit 11 transfers information indicating the results of quality judgment to the processing unit 5. Further, the quality judgment unit 11 transfers causal information indicating the cause of unsuitability and information indicating the hand region in the input vein image to the processing unit 5 when the input vein image is judged to be unsuitable.

The guidance processing unit 12 reads out the guidance message in accordance with the causal information which was notified from the processing unit 5 from the storage unit 4. For example, the guidance processing unit 12 reads the guidance message corresponding to the cause from the storage unit 4 when the causal information indicates that the position of the hand or finger is too much to the left side from the biometric information acquisition unit 3. The guidance message can, for example, be a message prompting the user to remove the cause for the input vein image becoming unsuitable such as "move hand a bit more to right and redo". Further, the guidance processing unit 12 reads the guidance message corresponding to the cause from the storage unit 4 when the causal information indicates that the position of the hand or finger is too far from the biometric information acquisition unit 3. The guidance message, for example, may be a message such as "move hand a bit more to the sensor and redo".

The guidance processing unit 12 displays the read guidance message on the display unit 2 to thereby prompt the user to move the hand or finger to a suitable position, then retry the operation for reading the vein pattern. Further, the guidance processing unit 12 may inform the guidance message to the user by voice through a speaker when the biometric authentication device 1 includes a speaker.

The effective biometric information extraction unit 13 extracts the effective biometric information, which is the information to be utilized for selection of the registered biometric information, from an unsuitable input vein image when the processing unit 5 judges that the input vein image is unsuitable.

Referring again to FIG. 2A and FIG. 2B, part of the hand 210 of the user which is contained in the capture region 200 also includes part of the vein pattern 220. Further, referring again to FIG. 3A and FIG. 3B, even if the area of the hand 310 of the user in the capture region 300 is small, thick veins can be discerned. For this reason, the effective biometric information extraction unit 13 can extract the information relating to the vein pattern even from an unsuitable input vein image which is obtained by capturing the hand which is placed at such an unsuitable position.

Therefore, the effective biometric information extraction unit 13 extracts the features relating to the vein pattern which is present in the hand region as the effective biometric information, based on, for example, information indicating the hand region in the unsuitable input vein image which is received from the processing unit 5.

The effective biometric information extraction unit 13, for example, extracts the branch points and end points of veins etc. as the features. Therefore, the effective biometric information extraction unit 13 extracts the branch points and end points of veins from an unsuitable input vein image by, for example, using the local threshold method to binarize the hand region of the unsuitable input vein image. Next, the effective biometric information extraction unit 13 processes the binarized hand region to thin the lines. After this, the effective biometric information extraction unit 13 scans the hand region thinned using a plurality of mask patterns to thereby detect the position on the unsuitable input vein image when any of the mask patterns is matched. Further, the effective biometric information extraction unit 13 extracts the center pixel at the position which is detected as a feature. Note that, each mask pattern has a binary pattern which, for example, is expressed by 3×3 pixels and corresponds to the branch points or end points of veins.

Further, the effective biometric information extraction unit 13 may extract from the hand region, as other effective biometric information, for example, as disclosed in Japanese Laid-Open Patent Publication No. 2007-249339, the profile of the curved direction in the vein image, profile of the trunk direction in the vein image, or frequency indicating the interval and number of trunk parts in the vein image. For example, the effective biometric information extraction unit 13 extracts the vein image by performing edge detection processing and line thinning processing in the hand region. Further, the effective biometric information extraction unit 13 approximates the extracted vein image by broken lines. The effective biometric information extraction unit 13 divides the broken line approximated vein image into segment units including two line segments. The effective biometric information extraction unit 13 extracts, as the curved direction, a directional vector of a vertical line to the line connecting the end points of the two line segments from the connecting point of the two line segments. Further, the effective biometric information extraction unit 13 makes the curved direction histogram calculated for the plurality of segments the curved direction of the vein image. Further, the effective biometric information extraction unit 13 may, for example, apply a Fast Fourier transform to the hand region to thereby determine the profile of the trunk direction in the vein image or the frequency indicating interval and number of trunk parts in the vein image.

Further, the effective biometric information extraction unit 13 may extract the frequency component relating to the image of the hand region as the effective biometric information. In this case, the effective biometric information extraction unit 13 enlarges the unsuitable input vein image to correct it so that the area of the hand region matches the reference area which is the average area of the hand region when the hand or finger of a person is placed at a suitable position with respect to the biometric information acquisition unit 3. Note that, the reference area is determined in advance and is stored in the storage unit 4.

After that, the effective biometric information extraction unit 13 processes the corrected enlarged unsuitable input vein image by frequency transform such as Fast Fourier transform or wavelet transform. The effective biometric information extraction unit 13 determines the frequency component of at least one predetermined frequency band in the image which is obtained by frequency transforming the unsuitable input vein image as the effective biometric information. Note that, the predetermined frequency band may, for example, be a frequency band with a changing frequency component if the contour shape or vein pattern of the hand region differs. Further, the effective biometric information extraction unit 13 may detect edges from the unsuitable input vein image or the enlarged corrected unsuitable input vein image to generate an edge image in which contours and veins of the hand region are detected and frequency-transforms the edge image.

Furthermore, the effective biometric information extraction unit 13 may make the region of a predetermined shape circumscribing the hand region or the region of a predetermined shape inscribing the hand region the effective biometric information. Note that, the region of the predetermined shape may be a shape encompassing the vein pattern in the hand region and not containing a part unnecessary for the matching process other than the hand region. For example, the predetermined shape may be made a rectangular or oval shape.

The effective biometric information extraction unit 13 may extract different effective biometric information according to the reason why the input vein image is unsuitable. For example, the effective biometric information extraction unit 13 receives causal information indicating the reason why the pattern is unsuitable from the processing unit 5. Further, when the causal information indicates that the hand or finger is off from the range of capture of the biometric information acquisition unit 3 and part of the biometric information which is use for the comparison is missing, the effective biometric information extraction unit 13 may extract the features in the hand region as the effective biometric information. On the other hand, when the causal information shows that the hand or finger is far from the biometric information acquisition unit 3, the effective biometric information extraction unit 13 extracts the frequency component relating to the image of the hand region as the effective biometric information.

The effective biometric information extraction unit 13 transfers the obtained effective biometric information to the effective biometric information matching unit 14.

Note that, each registered vein image is also processed in advance in the same way as the processing of the effective biometric information extraction unit 13 on the unsuitable vein image. Further, the effective biometric information is calculated for each registered vein image. The effective biometric information which is calculated for each registered vein image is stored in the storage unit 4 as one piece of the data relating to the registered biometric information of the corresponding registered user. However, when the effective biometric information is the same as the later explained feature amount for comparison, the feature amount for comparison is used as the effective biometric information the relating to the registered biometric information. For this reason, the storage unit 4 need not store the effective biometric information relating to the registered biometric information separate from the feature amount for comparison relating to the registered biometric information.

The effective biometric information matching unit 14 compares the effective biometric information which is obtained from an unsuitable input vein image and is received from the effective biometric information extraction unit 13 with the effective biometric information relating to the registered biometric information which is stored in the storage unit 4. Further, the effective biometric information matching unit 14 calculates the degree of similarity of the effective biometric information which was obtained from the unsuitable input vein image and the effective biometric information relating to the registered biometric information.

For example, when end points or branch points of veins or other features are found as the effective biometric information, the effective biometric information matching unit 14 selects a feature positioned near the center of gravity of the hand region of the unsuitable input vein image as the first reference feature. Further, the effective biometric information matching unit 14 selects one of the features extracted from the registered vein image in question as the second reference feature. Further, the effective biometric information matching unit 14 makes the registered vein image move in parallel so the second reference feature matches with the first reference feature. After this, the effective biometric information matching unit 14 rotates the registered vein image while finding the number of the features of the registered vein image which match with the features of the unsuitable input vein image. The effective biometric information matching unit 14 changes the combination of the first reference feature and the second reference feature while repeating the above processing to find the maximum value of the number of the features of the registered vein image which matches the features of the unsuitable input vein image.

Finally, the effective biometric information matching unit 14 finds the maximum value of the number of the matching features divided by the total number of features which are extracted from the input vein image as the degree of similarity. Therefore, in this case, the degree of similarity has a value of 0 to 1. The higher the degree of similarity of the vein pattern which is represented in the unsuitable input vein image and the vein pattern which is represented in the registered vein image, the closer the value of the degree of similarity to 1.

Further, when features relating to the vein pattern or shape of the hand region are obtained as the effective biometric information, the effective biometric information matching unit 14 calculates the total of the absolute values of the differences between the features which are obtained from the unsuitable input vein image and the corresponding features which are obtained from the registered vein images in question.

For example, the effective biometric information matching unit 14 calculates the absolute values of the differences between the values obtained from an unsuitable input vein image and the values obtained from a registered vein image in question for the profile of the curved direction in the vein image, profile of the trunk direction in the vein image, or frequency indicating the interval and number of trunks parts in the vein image, respectively. Further, the effective biometric information matching unit 14 makes the value obtained by totaling the absolute values of the differences the degree of similarity.

Alternatively, the effective biometric information matching unit 14 calculates the absolute values of the differences between the frequency component of a predetermined frequency band obtained from an unsuitable input vein image and the frequency component of the corresponding frequency band obtained from the registered vein image in question. Further, the effective biometric information matching unit 14 makes the value obtained by totaling the absolute values of the differences the degree of similarity.

In this case, the value of the degree of similarity becomes closer to 0 the higher the degree of similarity between the shape or vein pattern of the hand region represented in an unsuitable input vein image and the shape or vein pattern of the hand region represented in a registered vein image.

Furthermore, when the region of a predetermined shape circumscribing the hand region or the region of a predetermined shape inscribing the hand region is the effective biometric information, the effective biometric information matching unit 14 uses the region of the effective biometric information as a template and performs pattern matching with a registered vein image in question to calculate the degree of similarity.

In this case, the effective biometric information matching unit 14 changes the relative positions between the template and registered vein image in various ways and uses the following formulas to calculate the correlation value c(i,j) between the template and the registered vein image.

$$c(i, j) = \frac{\sum_x \sum_y \{(I(x, y) - I_{av})(T(x - i, y - j) - T_{av})\}}{\sqrt{\sum_x \sum_y (I(x, y) - I_{av})^2 \sum_x \sum_y (T(x - i, y - j) - T_{av})^2}}$$

Here, I(x,y) represents the value of the pixel with a horizontal coordinate x and a vertical coordinate y included in the registered vein image. Further, T(x-i,y-j) represents the value of the pixel with a horizontal coordinate (x-i), and a vertical coordinate (y-j) included in the template. Further, $I_{av}$ is the average pixel value of the pixels which are included in the registered vein image, while $T_{av}$ is the average pixel value of the pixels included in the template. Note that, i and j respectively represent amounts of deviation in the horizontal direction and vertical direction of the registered vein image and template. Furthermore, c(i,j) represents the correlation value when the registered vein image is off from the template in the horizontal direction by i pixels and in the vertical direction by j pixels. This correlation value c(i,j) can take a value included between −1 to 1. When the registered vein image and the template completely match, the correlation value c(i,j) becomes 1. On the other hand, when the registered vein image and the template are completely inverted, the correlation value c(i,j) becomes −1.

The effective biometric information matching unit 14 transfers degrees of similarity which are calculated for the registered biometric information together with the identification information of the registered user relating to the registered biometric information corresponding to the degrees of similarity to the selection unit 15.

The selection unit 15 selects registered biometric information similar to input biometric information which is represented in an unsuitable input vein image. For this reason, the selection unit 15 judges if a degree of similarity which is calculated for the registered biometric information satisfies a predetermined selection condition. Further, when a degree of similarity satisfies the selection condition, the selection unit 15 selects the registered biometric information corresponding to the degree of similarity for use for matching process with the suitable input vein image which is reacquired by the biometric information acquisition unit 3.

The selection condition, as explained above, is, for example, that the degree of similarity be a threshold value for selection use or more when the degree of similarity is a value relating to the maximum value of the number of the features of the registered vein image which matches the features of the unsuitable input vein image or when it is a correlation value obtained by pattern matching.

Further, the selection condition, as explained above, is, for example, that the degree of similarity be a threshold value for selection use or less when the degree of similarity is the sum of absolute values of differences between the features extracted from an unsuitable input vein image and features extracted from the registered vein image.

The threshold value for selection use is preferably set to a value such that when a user is judged to have no possibility at all of being a specific registered user, registered biometric information corresponding to a specific registered user not be selected by the selection unit 15. For example, the threshold value for selection use is set to the same value as the comparison threshold value which is defined in relation to the conditions for judging the successful user authentication explained later. Alternatively, the threshold value for selection use is set to a value so that the conditions by which the registered biometric information is selected become easier than the conditions for judging success of authentication by the authentication judgment unit 18.

The selection unit 15 refers to the identification information of the registered user which corresponds to the registered biometric information which is received from the effective biometric information matching unit 14 and thereby links a selection flag indicating selection to data relating to the registered biometric information corresponding to a degree of similarity judged to satisfy the predetermined conditions. Further, the selection unit 15 stores the selection flag in the storage unit 4. Alternatively, the selection unit 15 can copy the selected data relating to the registered biometric information in a memory region different from the memory region in which all of the data relating to the registered biometric information is stored. In this case, the selection unit 15 preferably stores the selected data relating to the registered biometric information in a memory region which the processing unit 5 can access at a higher speed than a memory region in which all of the data relating to the registered biometric information is stored. For example, when all of the data relating to the registered biometric information is stored in a magnetic disk device or other optical disk device or other secondary storage device, the selected data relating to the registered biometric information is stored in the semiconductor memory or other main storage device. Due to this, the processing unit 5 can speed up the matching process using the selected data relating to the registered biometric information.

The feature extraction unit 16 extracts a feature amount for the matching process from the suitable input vein image at the time of running the matching process.

The feature extraction unit 16, for example, like the effective biometric information extraction unit 13, extracts feature points such as the branch points and end points of veins as feature amount from the hand region. Alternatively, the feature extraction unit 16 may extract the profile of the curved direction in the vein image, profile of the trunk direction in the vein image, or frequency indicating the interval and number of trunk parts in the vein image as feature amount from the hand region. In this case as well, the feature extraction unit 16 may extract the feature amount using a method similar to the method explained in relation to the effective biometric information extraction unit 13. For this reason, here, the detailed explanation of the method for extraction of features is omitted.

Note that, the feature amount which the feature extraction unit 16 extracts may be feature amount of the same type as the features which the effective biometric information extraction unit 13 extracts or different types. For example, the effective biometric information extraction unit 13 may extract feature points such as the branch points and end points of veins as feature amount, while the feature extraction unit 16 may extract the profile of the curved direction in the vein image, profile of the trunk direction in the vein image, or frequency indicating the interval and number of trunk parts in the vein image as feature amount. Further, both the effective biometric information extraction unit 13 and the feature extraction unit 16 may extract feature points such as branch points and end points of veins as feature amount. When the effective biometric information and the feature amount for comparison are the same, it is sufficient to store just one as data relating to the registered biometric information, so the amount of data which is stored in the storage unit 4 can be small. On the other hand, when the effective biometric information differs from the feature amount for comparison, the processing unit 5 can use the different types of information to compare the input biometric information and the registered biometric information, so it is possible to improve the authentication processing compared with use of just a single type of information.

The feature extraction unit 16 transfers the feature amount such as the plurality of the feature points which are extracted from the suitable input vein image to the matching unit 17.

Note that, regarding the registered vein images as well, processing is performed similar to the processing of the feature extraction unit 16 on the suitable vein image explained above. Further, feature amount are calculated for the registered vein images as well. The feature amount which are calculated for the registered vein images are stored in the storage unit 4 as part of the data relating to the corresponding registered biometric information.

Further, as explained later, when the matching unit 17 runs the matching process using a comparison method not using feature amount, for example, pattern matching, the feature extraction unit 16 may be omitted.

The matching unit 17 compares the vein pattern which is the input biometric information represented in a suitable input vein image with the vein pattern which is the registered biometric information registered in advance. Further, the matching unit 17 determines the degree of similarity representing the degree by which the input biometric information is similar to the registered biometric information as a result of the matching process.

For example, the matching unit 17 can calculate the degree of similarity by examining the number of feature points which match the feature points which are extracted from the registered vein images among the feature points which are extracted from the suitable input vein image. Alternatively, the matching unit 17 can calculate the degree of similarity by calculating the sum of absolute values of differences between the feature amount extracted from the suitable input vein image and the feature amount extracted from the registered vein images. Alternatively, the matching unit 17 may calculate the degree of similarity by pattern matching between the region inscribed in or circumscribing the hand region contained in the suitable input vein image and the registered vein images. In this case as well, the matching unit 17 may use a method similar to the method explained in relation to the effective biometric information matching unit 14 to run the matching process. For this reason, here, a detailed explanation of the matching process will be omitted.

The matching unit 17 finds the maximum degree of similarity indicating that the input biometric information and the registered biometric information are most similar in the calculated degree of similarity. Further, the matching unit 17 transfers the maximum degree of similarity together with the identification information of the registered user relating to the registered biometric information corresponding to the maximum degree of similarity to the authentication judgment unit 18.

However, the feature extraction unit 16 and the matching unit 17 cover only the selected registered biometric information in the matching process when the selection unit 15 selects data relating to the registered biometric information which is estimated as having a high degree of similarity with the input biometric information. That is, the feature extraction unit 16 and the matching unit 17 use only the data relating to the registered biometric information to which a selection flag is linked for the matching process. Due to this, the feature extraction unit 16 and the matching unit 17 can reduce the number of times the matching process is performed after reinput of the input vein image when the once input vein image is unsuitable and the input vein image is again acquired. For this reason, the processing unit 5 can shorten the time required for the entire biometric authentication process.

The authentication judgment unit 18 judges if the maximum degree of similarity which was calculated by the matching unit 17 satisfies predetermined authentication conditions.

The authentication condition is that, for example, the maximum degree of similarity is the authentication judgment threshold value or more when the maximum degree of similarity, as explained above, is a value relating to the maximum value of the number of the features of the registered vein image matching with the features of a suitable input vein image or when it is a correlation value obtained by pattern matching. Further, the authentication condition is that, for example, the maximum degree of similarity is the authentication judgment threshold value or less when the maximum degree of similarity, as explained above, is the sum of the absolute values of the differences between the feature amount extracted from the suitable input vein image and the feature amount extracted from the registered vein images.

The authentication judgment unit 18 judges that the input biometric information matches the registered biometric information if the maximum degree of similarity satisfies the authentication conditions. Further, the authentication judgment unit 18 authenticates a user as a registered user corresponding to the registered biometric information which is judged to match the input biometric information. The authentication judgment unit 18 notifies the authentication results to the processing unit 5 if authenticating the user. Further, the processing unit 5 allows the user which was authenticated use of the system in which the biometric authentication device 1 is mounted or the system to which the biometric authentication device 1 is connected.

On the other hand, the authentication judgment unit 18 judges that the input biometric information does not match the registered biometric information when the maximum degree of similarity does not satisfy the authentication conditions. In this case, the authentication judgment unit 18 does not authenticate the user. The authentication judgment unit 18 notifies authentication results indicating failure of user authentication to the processing unit 5. Further, the processing unit 5 refuses the user which failed to be authenticated use of the system in which the biometric authentication device 1 is mounted or the system to which the biometric authentication device 1 is connected. Further, the processing unit 5 displays on the display unit 2 a message indicating failure of authentication.

The authentication judgment threshold value is preferably set to a value whereby the authentication judgment unit 18 succeeds in the authentication only when a registered user itself is the user. Further, the authentication judgment threshold value is preferably set to a value whereby the authentication judgment unit 18 fails in authentication when a person other than a registered user is the user. For example, the authentication judgment threshold value may be the value of the difference of the maximum value and minimum value which the degree of similarity can take multiplied with 0.7 plus the minimum value of the degree of similarity.

Figure 5A:
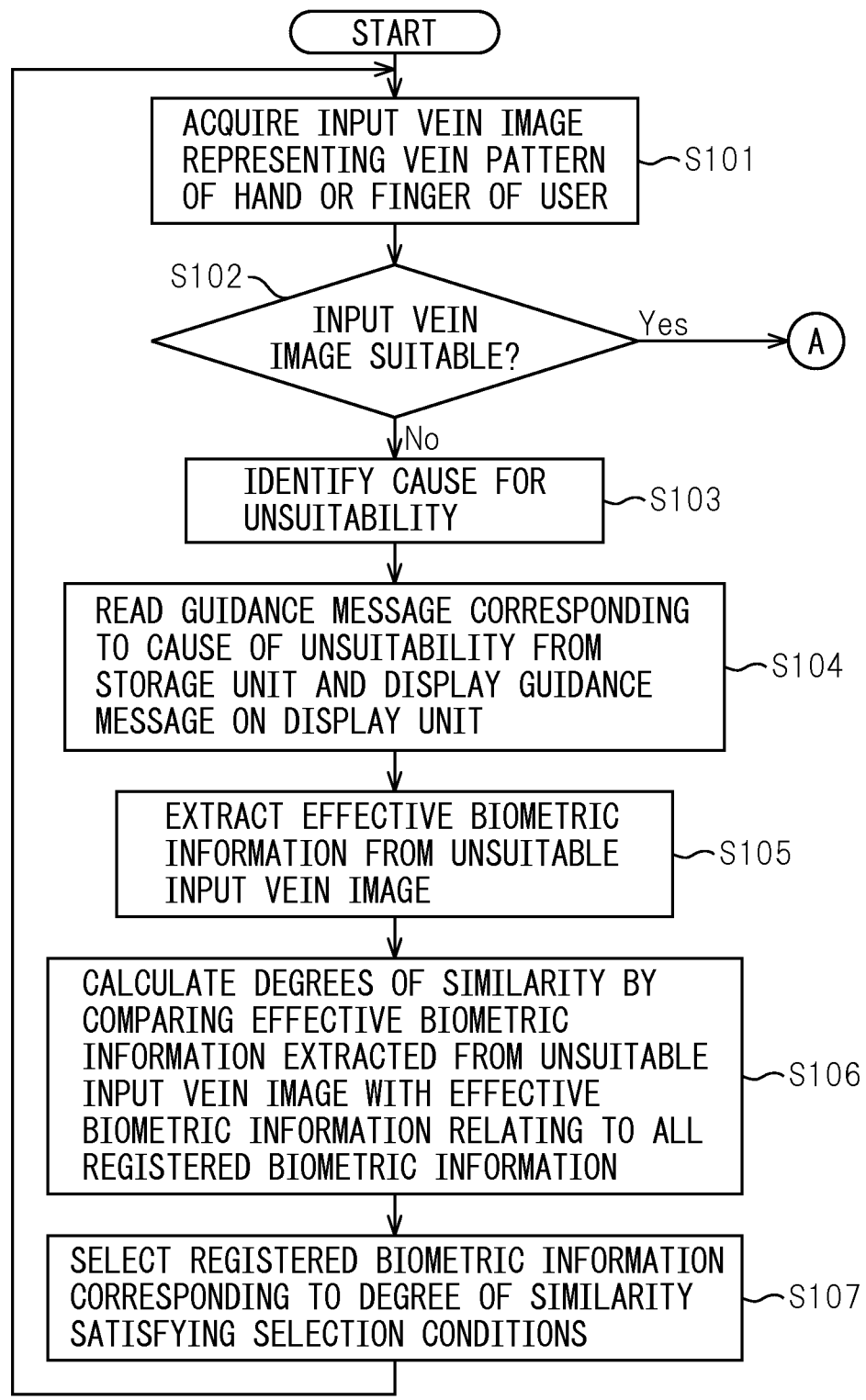

FIG. 5A and 5B illustrate a flow chart of operation of the biometric authentication process which is controlled by a computer program which is run on the processing unit 5.

As illustrated in FIG. 5A, the processing unit 5 acquires the input vein image representing the vein pattern of the hand or finger of the user, which is the biometric information of the user, from the biometric information acquisition unit 3 (step S101). Further, the quality judgment unit 11 of the processing unit 5 judges if the input vein image is suitable for utilization for the matching process (step S102). The quality judgment unit 11, for example, may judge if the input vein image is suitable based on the size or center of gravity position of the hand region which is extracted from the input vein image. When the input vein image is an unsuitable input vein image which is unsuitable for the matching process (step S102-No), the quality judgment unit 11 identifies the cause why the input vein image becomes unsuitable (step S103). Further, the quality judgment unit 11 transfers the causal information indicating the cause of the input vein image becoming unsuitable to the processing unit 5. Further, the quality judgment unit 11 transfers information which indicates the hand region in the unsuitable input vein image used for the quality judgment to the processing unit 5.

Next, when notified of the causal information from the processing unit 5, the guidance processing unit 12 of the processing unit 5 reads a guidance message which corresponds to the cause of unsuitability in accordance with the causal information from the storage unit 4. Further, the guidance processing unit 12 displays the read guide message on the display unit 2 (step S104).

Further, the effective biometric information extraction unit 13 of the processing unit 5 extracts the effective biometric information from the unsuitable input vein image (step S105). Further, the effective biometric information extraction unit 13 transfers the extracted effective biometric information to the effective biometric information matching unit 14 of the processing unit 5. The effective biometric information matching unit 14 compares the effective biometric information which is extracted from the unsuitable input vein image with the effective biometric information relating to all of the registered biometric information which is stored in advance in the storage unit 4 so as to calculate the respective degrees of similarity (step S106). Further, the effective biometric information matching unit 14 transfers the degrees of similarity which are calculated based on the registered biometric information together with the identification information of the registered users relating to the registered biometric information corresponding to the degrees of similarity to the selection unit 15 of the processing unit 5.

The selection unit 15 selects the registered biometric information corresponding to a degree of similarity satisfying a selection condition (step S107). Further, the selection unit 15 stores a selection flag for identification of data relating to the selected registered biometric information in the storage unit 4 or copies the data relating to the selected registered biometric information in a memory region separate from the data relating to all of the registered biometric information.

On the other hand, as illustrated in FIG. 5B, when the input vein image is a suitable vein pattern which is suitable for utilization for matching process (step S102-Yes), the feature extraction unit 16 of the processing unit 5 extracts the feature amount for comparison from the suitable input vein image (step S108). Further, it transfers the feature amount which are extracted by the feature extraction unit 16 to the matching unit 17 of the processing unit 5.

The matching unit 17 judges if there is registered biometric information which is selected by the selection unit 15 (step S109). If there is selected registered biometric information (step S109-Yes), the matching unit 17 compares the feature amount for comparison which are extracted from the suitable input vein image with the feature amount for comparison relating to the selected registered biometric information. Further, the matching unit 17 calculates the degrees of similarity between the input biometric information represented in the suitable input vein image and the selected registered biometric information (step S110).

On the other hand, if there is no selected registered biometric information (step S109-No), the matching unit 17 compares the feature amount for comparison which are extracted from the suitable input vein image and the feature amount for comparison relating to all of the registered biometric information. Further, the matching unit 17 calculates the degrees of similarity of the input biometric information represented in the suitable input vein image and all of the registered biometric information (step S111).

After steps S110 or S111, the matching unit 17 determines the maximum degree of similarity indicating that the input biometric information and the registered biometric information are most similar in the calculated degrees of similarity (step S112). Further, the matching unit 17 transfers the maximum degree of similarity together with the identification information of the registered user relating to the registered biometric information corresponding to the maximum degree of similarity to the authentication judgment unit 18 of the processing unit 5.

The authentication judgment unit 18 judges if the maximum degree of similarity satisfies an authentication condition (step S113). When the maximum degree of similarity satisfies the authentication condition (step S113-Yes), the authentication judgment unit 18 authenticates the user as the registered user corresponding to the maximum degree of similarity (step S114).

On the other hand, when the maximum degree of similarity does not satisfy the authentication condition (step S113-No), the authentication judgment unit 18 does not authenticate the user (step S115).

After step S114 or S115, the processing unit 5 ends the biometric authentication process.

Note that, the processing unit 5 may also execute the processing of steps S103 and S104, then execute the processing of steps S105 to S107 while the biometric information acquisition unit 3 is again generating an input vein image. Alternatively, the processing unit 5 may also perform the processing of steps S103 and S104 and the processing of steps S105 to S107 in parallel. Alternatively, further, the processing unit 5 may perform the processing of steps S103 and S104 and the processing of steps S105 to S107 switched in order.

Further, when the processing unit 5 cannot obtain the effective biometric information sufficient for selecting the registered biometric information from an unsuitable input vein image, the processing of steps S105 to S107 may be omitted. For example, after step S102, the processing unit 5 compares the area of the hand region occupied in the unsuitable input vein image which is calculated by the quality judgment unit 11 with the reference area, which is the average area of the hand region on the input vein image when the hand or finger of a person is placed at a suitable position with respect to the biometric information acquisition unit 3. Further, the processing unit 5 omits the processing of steps S105 to S107 when the ratio of the area of the hand region to the reference area is less than the minimum area ratio required for extraction of the effective biometric information. Note that, the minimum area ratio required for extraction of the effective biometric information may be any value included in, for example, the range of 0.3 to 0.5.

Furthermore, at step S109, if there is only one selected registered biometric information, the processing unit 5 may authenticate the user as being the user corresponding to the selected registered biometric information. In this case, the processing unit 5 can accurately authenticate the user even without reacquiring a suitable input vein image since there is no other registered biometric information which has the possibility of matching with the input biometric information. In this case, the processing of steps S110 to S113 and S115 may be omitted. For this reason, the processing unit 5 can shorten the time required for the entire biometric authentication process.

Further, as explained above, when pattern matching is used as the matching process, the matching unit 17 does not use feature amount which are extracted from the vein image, so the processing of the above step S108 may also be omitted. In this case, at steps S110 and S111, the matching unit 17 runs pattern matching between the suitable input vein image and a selected registered vein image or all of the registered vein images.

FIG. 6 is a schematic view illustrating a comparison of the time required for running the biometric authentication process according to one embodiment and the time required for running the biometric authentication device according to the prior art. In FIG. 6, the abscissa indicates the elapsed time. The blocks 600 represent the time of the biometric authentication process when the obtained input vein image is first suitable. Further, the blocks 610 represent the time of the biometric authentication process when the conventional biometric authentication device runs the matching process for all of the registered biometric information after reacquiring the input vein image when the obtained input vein image is first unsuitable. On the other hand, the blocks 620 represent the time of the biometric authentication process by the biometric authentication device 1 selecting registered biometric information for matching process based on an unsuitable input pattern when the obtained input vein image is first unsuitable.

Further, in the blocks, the block 601 represents the time required for acquiring the input vein image. Further, the block 602 represents the time required for judging the quality of the acquired input vein image. Furthermore, the block 603 represents the time required for extracting features relating to the vein pattern from the input vein image. Furthermore, the block 604 represents the time required for the matching process covering all of the registered biometric information. On the other hand, the block 605 represents the time required for the matching process for only the selected registered biometric information based on the unsuitable input vein image. Furthermore, the block 606 represents the time required for extracting the effective biometric information relating to the vein pattern or hand region from an unsuitable input vein image. The block 607 represents the time required for selection of part of the registered biometric information from the registered biometric information. Further, the block 608 represents the time required for the authentication judgment processing.

When the obtained input vein image is first suitable, as indicated by the blocks 600, the biometric authentication device according to the prior art and the biometric authentication device according to the present embodiment run the matching process on all of the registered biometric information. For this reason, the time required for the biometric authentication device according to the prior art to run the entire biometric authentication process is equal to the time required for the biometric authentication device 1 according to the present embodiment to run the biometric authentication process as a whole.

However, when the obtained input vein image is first unsuitable, the biometric authentication device according to the prior art cannot run the matching process until the input vein image is reacquired and feature extraction processing for the reacquired input vein image ends. Furthermore, the biometric authentication device according to the prior art must run the matching process for all of the registered biometric information after the end of the feature extraction processing.

As opposed to this, during reacquisition of the input vein image by the biometric information acquisition unit 3, the processing load of the processing unit 5 for the reacquisition processing is small. For this reason, while the biometric authentication device 1 is reacquiring the input vein image and running the quality judgment processing for the reacquired input vein image, the processing unit 5 can run processing for selecting part of the registered biometric information from the registered biometric information based on the unsuitable input vein image. As a result, the biometric authentication device 1 may run the matching process only for the selected registered biometric information after the feature extraction processing for the reacquired input vein image ends. Therefore, the biometric authentication device 1 can shorten the time required for the entire biometric authentication process compared with the biometric authentication device according to the prior art by exactly the difference between the time of the matching process indicated by the block 604 and the time of the matching process indicated by the block 605.

As explained above, the biometric authentication device according to one embodiment instructs the user to reinput the biometric information when part of the biometric information which is represented in the input biometric image is missing or the biometric information is unclear. On the other hand, this biometric authentication device selects the registered biometric information similar to this incomplete input biometric information from all of the registered biometric information registered in advance. Further, the biometric authentication device compares the input biometric information represented in a suitable input biometric image, which is obtained by the user making the biometric information acquisition unit again read the biometric information, with only the selected registered biometric information. Due to this, the biometric authentication device can reduce the number of the registered biometric information for which biometric authentication process is run after the input biometric image is reinput and thereby suppress an increase in the processing time which is required for running the biometric authentication process as a whole.

Note that, the present invention is not limited to the above embodiments. For example, the storage unit may also store the effective biometric information extracted from an unsuitable input vein image at the time of the previous acquisition as previous effective biometric information when there is registered biometric information which is already selected by previously performed selection processing. Further, the effective biometric information matching unit of the processing unit compares the latest effective biometric information, which is acquired from the newly acquired input vein image, with the previous effective biometric information when the newly acquired input vein image is judged unsuitable by the quality judgment unit. Further, the effective biometric information matching unit calculates the degree of similarity between the previous effective biometric information and the latest effective biometric information. Further, the selection unit of the processing unit unselects all of the already selected registered biometric information when the degree of similarity between the previous effective biometric information and the latest effective biometric information does not satisfy a predetermined selection condition and the latest effective biometric information is judged to not match the previous effective biometric information. For example, when a selection flag is linked with the selected data relating to the registered biometric information, the selection unit erases the selection flag. Alternatively, when the selected data relating to the registered biometric information is stored in a memory region separate from the memory region in which other registered biometric information is stored, the selection unit erases the data relating to the registered biometric information which is selected from the separate memory region. This reason is that a user trying to obtain biometric authentication from the biometric authentication device may be followed by a different user before the latest input vein image is acquired from the acquisition of the previous input vein image. All of the already selected registered biometric information is once unselected, then the effective biometric information matching unit of the processing unit compares the effective biometric information relating to all of the registered biometric information with the latest effective biometric information to calculate the degree of similarity. Further, the selection unit again selects registered biometric information corresponding to the degree of similarity satisfying the selection condition.

On the other hand, the selection unit may maintain the already selected registered biometric information as it is when judging that the latest effective biometric information matches previous effective biometric information.

Further, even when none of the degrees of similarity which are calculated for the already selected registered biometric information satisfies the selection condition, the user which tries to obtain biometric authentication from the biometric authentication device may be followed by a different user. In this case as well, the effective biometric information matching unit compares the effective biometric information relating to the not selected registered biometric information with the latest effective biometric information. Further, the selection unit unselects all of the already selected registered biometric information and instead selects the registered biometric information corresponding to the degree of similarity satisfying the selection condition.

Furthermore, when there is already selected registered biometric information, even when the processing unit cannot detect the hand region from the input vein image which is generated by the biometric information acquisition unit, all of the registered biometric information already selected is unselected. In this case as well, it is assumed that the hand which swiped the biometric information acquisition unit has been removed, so the user which tries to obtain biometric authentication from the biometric authentication device may be followed by a different user. Further, the effective biometric information matching unit and the selection unit compare the effective biometric information relating to all of the registered biometric information with the latest effective biometric information to reselect the registered biometric information.

Further, the processing unit may unselect all of the registered biometric information which has been already selected when some sort of error occurs in the processing of the components of the processing unit or when a command for clearing the selected registered biometric information is input through the input unit.

Further, the authentication judgment unit of the processing unit may judge if the degree of similarity satisfies the authentication condition each time the matching unit calculates the degree of similarity corresponding to any registered biometric information. In this case, the authentication judgment unit authenticates the user as the registered user corresponding to the degree of similarity which is judged to first satisfy the authentication condition. According to this modification, the processing unit sometimes need not compare the input biometric information with all of the selected registered biometric information, so the time required for the entire biometric authentication process may be able to be further shortened.

Further, according to another embodiment, the biometric authentication device may also acquire identification information of the user through an input unit and thereby compare only the registered biometric information specified by the identification information with the input biometric information of the user. In this case, the biometric authentication device may also utilize the results of comparison of the effective biometric information extracted from the input vein image unsuitable for matching process and the effective biometric information relating to the specified registered biometric information to assist the biometric authentication process based on the comparison of the input biometric information represented in a suitable input vein image acquired after this and the registered biometric information.

In this case as well, the biometric authentication device runs the processing by the effective biometric information extraction unit and the effective biometric information matching unit of the processing unit when it is judged by the quality judgment unit of the processing unit that the input vein image is suitable for use for the matching process. Further, the biometric authentication device calculates the degree of similarity between the effective biometric information extracted from the unsuitable input vein image and the effective biometric information relating to the registered biometric information specified by the identification information of the user. Further, the matching unit of the processing unit compares the input biometric information which is represented in the later obtained suitable input vein image with the registered biometric information specified by the identification information of the user to calculate the degree of similarity. Further, the authentication judgment unit of the processing unit may authenticate the user when the degree of similarity which was calculated by the matching unit satisfies the above-mentioned authentication condition and the degree of similarity which was calculated by the effective biometric information matching unit satisfies the above-mentioned selection condition. Due to this, the biometric authentication device according to another embodiment can use a plurality of the input vein images which were captured under different conditions to run the biometric authentication process, so it is possible to improve the authentication precision. Further, in this case as well, when an unsuitable input vein image is first obtained, the biometric authentication device can run the matching process using the unsuitable input vein image while the input vein image is being reacquired. For this reason, this biometric authentication device can prevent the time required for the biometric authentication process from increasing despite utilizing a plurality of the input vein images for biometric authentication process.

Furthermore, the biometric authentication device and the biometric authentication method which are disclosed in this Description can be applied to various apparatuses or systems which run biometric authentication process between the biometric information of a user and preregistered biometric information for enabling the user to perform some sort of operation. For example, such an apparatus or system includes a computer system having one or more terminals and a server connected through a communication network or an access control system. In this case, each terminal is provided with a biometric information acquisition unit. The biometric image which is acquired by the biometric information acquisition unit is sent to the server. Further, the server runs the functions of the processing unit of the above embodiments so as to run the biometric image registration processing or biometric authentication process. Alternatively, a processing unit of a portable memory device formed integrally with the biometric information acquisition unit, storage unit, processing unit, and data transfer interface based on the Universal Serial Bus or other standard may have the functions of the processing unit of the computer in the above embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A biometric authentication device comprising:
   a biometric information acquisition unit which acquires biometric information of a user and generates a first input biometric image which represents the biometric information;
   a storage unit which stores data relating to registered biometric information of at least one registered user registered in advance; and
   a processing unit which realizes
   a quality judgment function which judges whether the first input biometric image is suitable or not for use for comparison of the biometric information represented in the first input biometric image with the registered biometric information;
   a selection function which selects registered biometric information which is similar to biometric information which is represented in the first input biometric image among the registered biometric information when the first input biometric image is judged unsuitable; and
   a matching process function which compares the biometric information which is represented in second input biometric image which is generated by reacquisition of the biometric information of the user by the biometric information acquisition unit and the selected registered biometric information.

2. The biometric authentication device according to claim 1, wherein the processing unit uses the selection function to select registered biometric information which is similar to the biometric information which is represented in the first input biometric image while the biometric information acquisition unit is generating the second input biometric image.

3. The biometric authentication device according to claim 1, wherein the quality judgment function detects an image of a portion of the user including the biometric information which is used for comparison from the first input biometric image and judges that the first input biometric image is unsuitable when it is judged based on the position of the image in the first input biometric image that at least part of the biometric information which is used for the comparison is missing in the first input biometric image.

4. The biometric authentication device according to claim 1, wherein the quality judgment function detects an image of a portion of the user including the biometric information which is used for comparison from the first input biometric image and judges that the first input biometric image is unsuitable when the area which the image occupies in the first input biometric image is a predetermined minimum allowable area or less.

5. The biometric authentication device according to claim 1 wherein the processing unit authenticates the user as a registered user corresponding to registered biometric information when there is only one selected registered biometric information.

6. The biometric authentication device according to claim 1, wherein the processing unit further realizes
   an effective biometric information extraction function which extracts feature amount relating to the biometric information of the user as effective biometric information from the first input biometric image when the first input biometric image is judged unsuitable; and
   an effective biometric information comparison function which compares the effective biometric information with data relating to the registered biometric information to thereby calculate the degree of similarity between the registered biometric information and the biometric information which is represented in the first input biometric image when the first input biometric image is judged unsuitable, and wherein the selection function selects the registered biometric information corresponding to the degree of similarity satisfying a predetermined selection condition among the registered biometric information.

7. The biometric authentication device according to claim 6, wherein the effective biometric information extraction function stores the effective biometric information which is extracted from the first input biometric image as previous effective biometric information in the storage unit and extracts the effective biometric information from a third input biometric image which is generated by the biometric information acquisition unit after the first input biometric image is generated, when the third input biometric image is judged unsuitable by the quality judgment function and the selection function judges whether the effective biometric information which is extracted from the third input biometric image match the previous effective biometric information and unselects the selected registered biometric information when the effective biometric information do not match the previous effective biometric information.

8. A biometric authentication method comprising:

acquiring biometric information of a user to generate a first input biometric image which represents the biometric information by a biometric information acquisition unit;

judging whether the first input biometric image is suitable or not for use for comparing the biometric information represented in the first input biometric image with the registered biometric information of at least one registered user registered in advance by a processor;

selecting registered biometric information similar to the biometric information represented in the first input biometric image among the registered biometric information when the first input biometric image is judged unsuitable by the processor;

reacquiring the biometric information of the user to thereby generate a second input biometric image by the biometric information acquisition unit; and comparing the biometric information represented in the second input biometric image with the selected registered biometric information by the processor.

9. A non-transitory computer readable recording medium having a computer program recorded thereon for causing a computer to perform biometric authentication, the computer program causes the computer to execute:

judging whether a first input biometric image which is generated by a biometric information acquisition unit is suitable or not for use for comparison of biometric information of the user which is represented in the first input biometric image with the registered biometric information of at least one registered user which is stored in a storage unit;

selecting registered biometric information similar to the biometric information represented in the first input biometric image among the registered biometric information when the first input biometric image is judged unsuitable; and comparing biometric information represented in a second input biometric image generated by the biometric information acquisition unit with the selected registered biometric information.

10. A biometric authentication device comprising:

a biometric information acquisition unit which acquires biometric information of a user and generates a first input biometric image which represents the biometric information;

a storage unit which stores data relating to registered biometric information of at least one registered user registered in advance together with identification information of the registered user;

an input unit which acquires the identification information of the user; and a processing unit which realizes a quality judgment function which judges whether the first input biometric image is suitable or not for use for comparison of the biometric information represented in the first input biometric image with the registered biometric information;

an effective biometric information matching function which calculates a first degree of similarity between registered biometric information which is specified by the identification information of the user which is input through the input unit and biometric information which is represented in the first input biometric image when the first input biometric image is judged unsuitable;

a matching process function which compares the biometric information which is represented in a second input biometric image which is generated by the biometric information acquisition unit reacquiring the biometric information of the user with the registered biometric information specified by the identification information of the user to calculate a second degree of similarity; and an authentication function which authenticates a user as a registered user corresponding to registered biometric information specified by identification information of the user when the first degree of similarity and the second degree of similarity satisfy predetermined authentication conditions.

* * * * *